United States Patent
Vivanco et al.

(10) Patent No.: US 9,668,180 B1
(45) Date of Patent: May 30, 2017

(54) SYSTEMS AND METHODS FOR IDENTIFYING AND RESOLVING CELL ID CONFUSION BETWEEN NEIGHBORING CELLS IN A WIRELESS NETWORK

(71) Applicant: Sprint Spectrum LP, Overland Park, KS (US)

(72) Inventors: Daniel Vivanco, Sterling, VA (US); Chunmei Liu, Great Falls, VA (US); Hemanth Pawar, Brambleton, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 126 days.

(21) Appl. No.: 14/476,858

(22) Filed: Sep. 4, 2014

(51) Int. Cl.
*H04W 36/00* (2009.01)
(52) U.S. Cl.
CPC ................. *H04W 36/0083* (2013.01)
(58) Field of Classification Search
None
See application file for complete search history.

(56) References Cited

U.S. PATENT DOCUMENTS

| | | | | |
|---|---|---|---|---|
| 2010/0285772 A1* | 11/2010 | Colonna | .............. | G08G 1/0104 455/405 |
| 2010/0291929 A1* | 11/2010 | Stephens | ............... | H04W 24/02 455/436 |
| 2011/0263282 A1* | 10/2011 | Rune | .................... | H04J 11/0093 455/507 |
| 2012/0275315 A1* | 11/2012 | Schlangen | ............ | H04W 24/02 370/242 |
| 2012/0329461 A1* | 12/2012 | Teyeb | ............... | H04W 36/0061 455/437 |
| 2014/0073304 A1* | 3/2014 | Brisebois | .............. | H04W 24/02 455/418 |
| 2014/0087735 A1* | 3/2014 | Vikberg | ............ | H04W 36/0055 455/436 |
| 2014/0295813 A1* | 10/2014 | Grech | ................... | H04W 16/18 455/418 |

FOREIGN PATENT DOCUMENTS

JP 2009182538 A * 8/2009

OTHER PUBLICATIONS

LTE PCI Planning (http://www.telecom-cloud.net/wp-content/uploads/2010/09/PCI-Planning-for-LTE.pdf—Nov. 2012).*

* cited by examiner

*Primary Examiner* — San Htun

(57) ABSTRACT

Systems and methods are described for identifying and resolving cell identifier confusion in a wireless network. A serving cell may determine that multiple neighboring cells have a duplicate cell identifier. The serving cells may receive signal measurement reports and network characteristics for the neighboring cells in order to determine if there is an opportunity for handover between the neighboring cells and the serving cell. If the multiple neighboring cells appear in a single signal measurement report from a single wireless device, there this is an opportunity for handover, and one of the neighboring cells may be instructed to change its cell identifier. However, the network characteristics indicate that the neighboring cell does not have coverage sector overlap, then there is no opportunity for handover and the neighboring cell may be removed from a database used by the serving cell during a handover process.

16 Claims, 6 Drawing Sheets

SYSTEMS AND METHODS FOR IDENTIFYING AND RESOLVING CELL ID CONFUSION BETWEEN NEIGHBORING CELLS IN A WIRELESS NETWORK

TECHNICAL BACKGROUND

Cell identifier (ID) confusion may occur when there is a duplicate cell ID for multiple cells capable of handover to or from a neighboring cell that is serving at least one wireless device. When cell ID confusion exists, it is possible to perform a handover incorrectly because the duplicate cell ID may be used to obtain handover information for a cell that is not the intended target. Such confusion may ultimately cause a handover to fail and a call on the at least one wireless device to be dropped. In order to reduce failure during handovers, it may be desirable for a network operator to instruct at least one of the cells having the duplicate cell ID to change its cell ID.

However, there may be situations in which apparent cell ID confusion is not actual cell ID confusion. Network operators may pre-configure new or existing cells with information about all potential neighboring cells prior to information actually being received at the pre-configured cells from wireless devices. The pre-configured cells may contain or may access a database in which information such as cell ID is contained. In an exemplary embodiment, such a database may be a neighbor relations table (NRT). When a duplicate cell ID appears in a serving cell database, there is potential cell ID confusion.

When there is no opportunity for handover to the incorrect cell, it may be an inefficient use of network resources to initiate and carry out a change of cell ID. Therefore, it may be desirable to determine whether actual cell ID confusion exists by determining opportunity for handover to each cell having the duplicate cell ID.

OVERVIEW

Systems and methods are described for identifying and resolving cell ID confusion in a wireless network having multiple neighbors with a duplicate cell ID. A serving cell may have a database within a memory, or to access a database on another network node, and either database may configured at a beginning of a time period to include one or more first neighboring cells. A network operator may configure either embodiment of the serving cell database based on potential neighboring cells within a geographic or other pre-defined area with respect to the serving cell. Neighboring cells may be also be added to the serving cell database using a protocol for neighbor relations such as automatic neighbor relations (ANR).

Upon determining that multiple neighboring cells within the serving cell database have a duplicate cell ID, a process may be initiated to resolve the potential cell ID confusion so that it does not interfere with a handover attempt of a wireless device. The process may determine whether a handover opportunity exists between the various neighboring cells and the serving cell by analyzing received signal measurement reports received from wireless devices within range of the neighboring cells and the serving cell or by analyzing network characteristics of each neighboring cell and its surrounding cells within each neighboring access node.

If it is determined that there is a coverage sector overlap between various cells that would enable a handover opportunity to exist, then the process must continue to resolve the actual cell ID confusion. The serving cell may either remove cells from the database based on network characteristics or the serving cell may instruct a neighboring cell to change its cell identifier.

DETAILED DESCRIPTION

Figure 1:
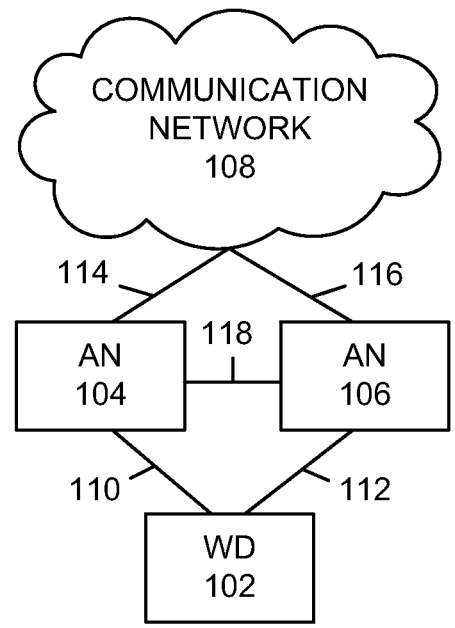
FIG. 1 illustrates an exemplary communication system to identify and resolve cell ID confusion between neighboring cells in a wireless network.

FIG. 1 illustrates an exemplary communication system 100 to determine an access node for a wireless device comprising wireless device 102, access nodes 104 and 106, communication network 108, and communication links 110, 112, 114, and 116. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 104 and 106, any number of wireless devices can be implemented.

Access nodes 104 and 106 are network nodes capable of providing wireless communications to wireless device 102, and can be, for example, a base transceiver station, a radio base station, a NodeB device, or an eNodeB device. Access nodes 104 and 106 may communicate with communication network 108 over communication links 114 and 116. Access nodes 104 and 106 may also communicate directly with each other over communication link 118. In an embodiment, access node 104 can comprise a serving access node for wireless device 102. Access nodes 104 and 106 may each comprise one or more cells, and each cell may be associated with a band class. In the embodiment where access node 104 is the serving access node, one of the cells within access node 104 is a serving cell.

Although only two access nodes 104 and 106 are illustrated in FIG. 1, wireless device 102 can be in communication with a plurality of access nodes, each access node comprising one or more cells. The plurality of access nodes can be associated with different networks and can support different communication protocols and radio access technologies. Furthermore, the one or more cells can be associated with different band classes deployed within the plurality of access nodes for various purposes.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or other types of communication equipment, as well as combinations thereof.

Communication links 110, 112, 114, 116, and 118 can be wired or wireless communication links. Wired communication links can comprise, for example, twisted pair cable, coaxial cable, or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, WiMAX, or 3GPP LTE, or combinations thereof. Other wireless protocols can also be used.

Figure 2:
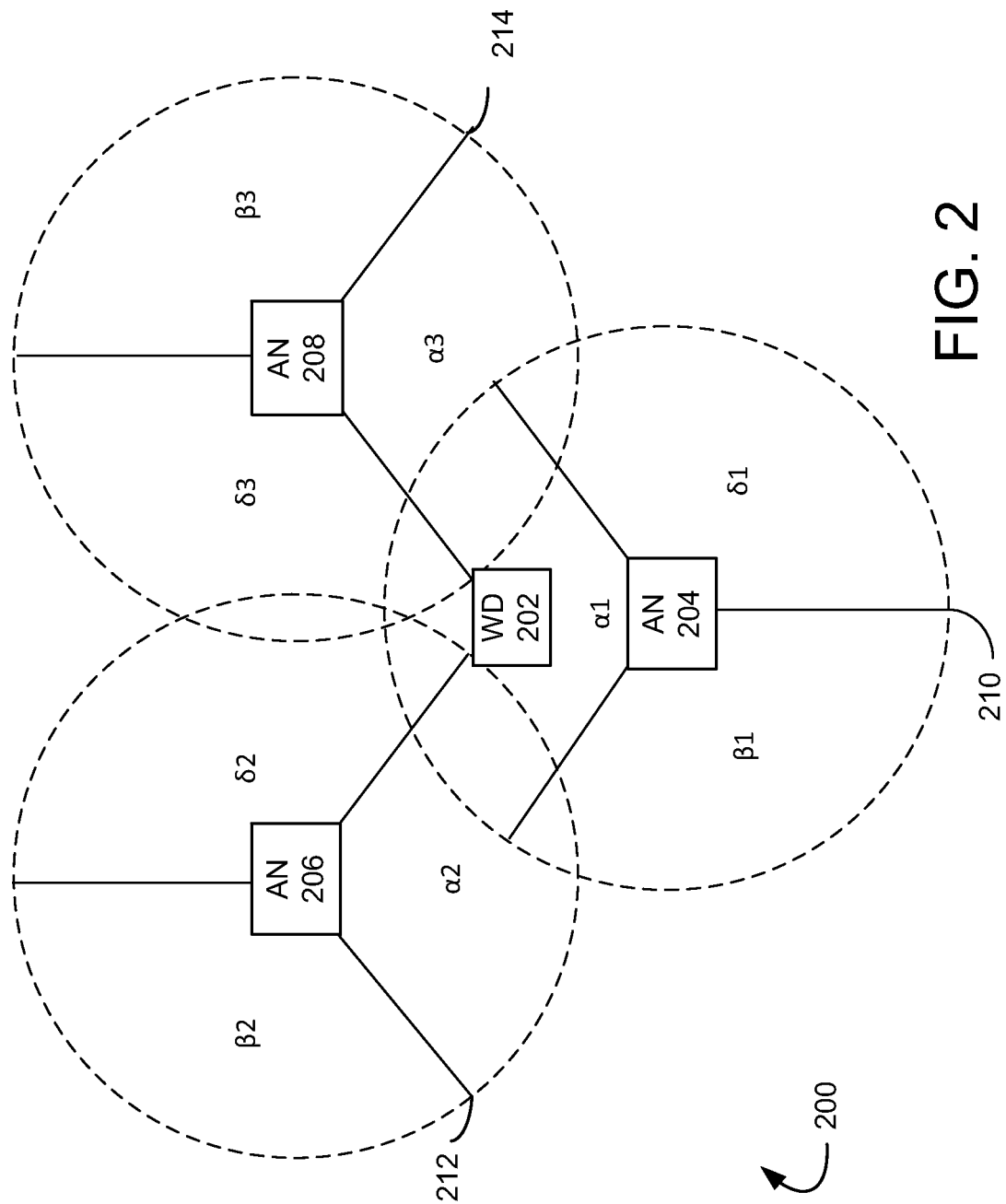
FIG. 2 illustrates another exemplary system to identify and resolve cell ID confusion between neighboring cells in a wireless network.

FIG. 2 illustrates an exemplary communication system 200 to identify and resolve cell ID confusion between neighboring cells in a wireless network. System 200 comprises at least one wireless device 202, access nodes 204, 206, and 208, each access node comprising one or more cells ($\alpha_{1,2,3}$, $\beta_{1,2,3}$, $\delta_{1,2,3}$), and signal radii 210, 212, and 214 within which the one or more cells are able to transmit and receive wireless signals to and from wireless devices such as wireless device 202. The one or more cells within each of the access nodes 204, 206, 208 have coverage sectors within the area of the signal radius for that access node, each coverage sector being distinct from those of other cells within the same access node. While only one wireless device is shown, it is to be understood that there will typically be more than one wireless device in wireless communication with each access node. Wireless device 202 may comprise a device similar to wireless device 102 of FIG. 1. Similarly, access nodes 204 and 206 may comprise access nodes similar to access nodes 104 and 106 of FIG. 1.

In operation, wireless device 202 may establish communication with a cell of access node 204 such that access node 204 provides the wireless device access to a communication network such as communication network 108, illustrated in FIG. 1. The cell with which wireless device 202 establishes communication becomes the serving cell, and in the exemplary embodiment of FIG. 2, cell $\alpha_1$ of access node 204 may be the serving cell. In this embodiment, access nodes 206 and 208 may be determined to be neighboring access nodes the serving cell and information about these nodes and all of the cells within these neighboring access nodes, which may be neighboring cells, may be maintained in a database to facilitate efficient handover of wireless devices between the various neighboring cells and the serving cell.

Wireless device 202 may detect the reference signal from one or both of the access nodes 206 and 208. If it is determined that the reference signal from both of the access nodes 206 and 208 meet a threshold signal level at a single wireless device such as wireless device 202, that wireless device may report this signal level information to the serving cell to indicate that a handover opportunity theoretically exists. The signal level may be represented by received signal strength indication (RSSI), reference signal received power (RSRP), reference signal received quality (RSRQ), signal to interference plus noise ratio (SINR), and may be maintained in the serving cell database.

In an embodiment, when each reference signal from the cells within access nodes 206 and 208 meet a threshold signal level in a signal level measurement report of a single wireless device, access node 204 may instruct each at least one of the cells with a duplicate cell ID to change its cell ID to avoid confusion. In the exemplary embodiment of FIG. 2, it may be possible for wireless device 202 to report signal levels for cells $\alpha_2$, $\delta_2$, $\alpha_3$, or $\delta_3$. If a unique cell identifier for each of the cells $\delta_2$ and $\delta_3$ appears in a signal measurement report from wireless device 202, and these cells also have a duplicate cell ID, then this indicates that there is actual cell ID confusion and one of the cells must be instructed to change its cell ID.

In an embodiment, communication system 200 may be configured to manage access node neighbor relations. For example, communication system 200 may implement a self-organizing network (SON) protocol that includes an automatic neighbor relations (ANR) process, or may implement any other suitable protocol for managing access node and cell neighbor relations.

In an embodiment, access node 204 may be pre-configured with the cells of access nodes 206 and 208, or the cells may be added to a database such as a neighbor list or a neighbor relations table for use during a handover process. Access node 204 may also track neighbor access nodes and update the database with information regarding cells that are or are not candidates for handover.

The database may be part of a neighbor relations table (NRT). The NRT may store various identifiers for neighboring access nodes and their respective cells, such as physical cell identifiers (PCI), cell global identifications (CGI), E-UTRAN cell identifiers (ECI), E-UTRAN cell global identifiers (ECGI), eNodeB identifiers (eNB-ID), or the like, connection information (e.g., X2 connection information), handover information, and any other relevant neighbor information. In this example, the neighbor list or the NRT for access node 204 may not contain an entry for one or more of the cells within access node 206.

In an embodiment, the database of access node 204 may be configured with information regarding cells $\beta_2$ and $\beta_3$ of neighboring access nodes 206 and 208, respectively. As there is no coverage sector overlap between these cells and the serving cell of access node 204, no opportunity for handover to these cells exists and so there would be no risk of confusion between cells during a handover and changing the cell ID of either cell would be an inefficient use of network resources. That is, if either $\beta_2$ or $\beta_3$ have a duplicate cell ID with any cell of the other neighboring access node, there is no need to change cell ID because there is no opportunity for handover from the serving cell to cells $\beta_2$ or $\beta_3$ in the exemplary embodiment of FIG. 2.

Access node 204 may be configured to update information regarding cells of access nodes 206 and 208 using, for example, an ANR process. ANR and similar protocols may be especially useful in rapidly developing networks in which new access nodes and new cells are added within relatively short periods of time. These types of protocols allow access nodes to become aware of neighbors and their respective network characteristics without manual updating of databases by network operators, which can be time consuming and expensive to continually provide updated information. The network characteristics for each cell within each neighboring access node may be determined and analyzed to determine whether there is coverage sector overlap with the serving cell.

In an embodiment, access node 204 may use wireless devices such as wireless device 202 in communication with access node 204 in order to discover new neighbor access nodes (cells). For example, access node 204 may communicate with wireless device 202 in order to discover one or more neighbor access nodes such as access node 206. Here, access node 204 may transmit criteria, such as ANR criteria or criteria of another suitable protocol, to wireless devices in communication with access node 204 (e.g., wireless device 202). The ANR or other protocol criteria may comprise criteria based on relative signal information received at the wireless devices. An event may be triggered at wireless device 202 based on a comparison of the received criteria, a signal level for a reference signal or pilot signal received from access node 204, and a signal level for a reference signal or pilot signal received from access node 206.

In another embodiment, access node 204 may already be aware of each cell within access nodes 206 and 208, and one or more of the cells within 206 may be contained in the serving cell database. However, based on a network event such as maintenance, monitoring, or detection of reference signal levels above or below a threshold, access node 204 may trigger wireless device 202 to provide information about access node 206, such as a signal level for a reference signal of access nodes 206 or 208. As noted above, wireless device 202 is representative of one or more wireless devices in communication with a particular serving cell within access node 204.

In response to the triggered event, wireless device 202 may transmit a measurement report to access node 204 comprising one or more signal levels for each reference signal or pilot signal received at the wireless device from cells within access nodes such as access node 206 having signal radii that cover an area in which the wireless device is located, and at least one identifier (e.g., PCI, CGI, ECI, ECGI, eNB-ID, or the like) for each reported access node. In an embodiment, the measurement report may comprise only signal levels that are above a signal level threshold.

In an embodiment, an access node may request network characteristics from cells within all access nodes identified in the measurement report provided by each wireless device with which the access node is in communication. Access node and cell network characteristics may comprise current and/or historical data including a utilization indicator such as physical resource block (PRB) usage, a connectivity indicator such as number of RRC connections, a capacity indicator such as average data volume per RRC connection, and handover statistics for each access node and their respective cells.

In an embodiment, handover statistics may comprise a number of successful handovers between neighboring cells themselves or between the neighboring cells and the serving cell. The number of number of successful handovers may be an indicator that a handover opportunity exists. The network characteristics for each cell of access nodes 206 and 208 may be used to maintain the serving cell database. Based on the exemplary and non-limiting coverage sectors illustrated in FIG. 2, it would be likely that handover opportunities exist between the exemplary serving cell and cells $\alpha_2$, $\delta_2$, $\alpha_3$, or $\delta_3$ of neighboring access nodes 206 and 208 but handovers are likely not possible to cells $\beta_2$ or $\beta_3$ of neighboring access nodes 206 and 208. Access node 204 may request network characteristics of the cells within access nodes 206 and 208 via an X2 link or by other similar means, or network characteristics may be reported by wireless device 202.

If the number of successful handovers to a particular cell is very small (e.g. zero or below a low threshold) after an amount of time in which other cells have had some successful handovers, it is likely that there is no opportunity for handover to that particular cell. Therefore, it may be advantageous for a network operator to set threshold limits for numbers of successful handovers that will trigger a determination that at least some cells of the neighboring access node have overlapping coverage sectors with the serving cell. In this scenario, when there are no successful handovers, or a number below a threshold limit of successful handovers, the particular cell may be determined to have no coverage sector overlap with the serving cell. When there is no coverage sector overlap, the particular cell does not need to change a duplicate cell ID and in some cases it may be desirable to remove the particular cell from the database of the serving cell.

Figure 3:
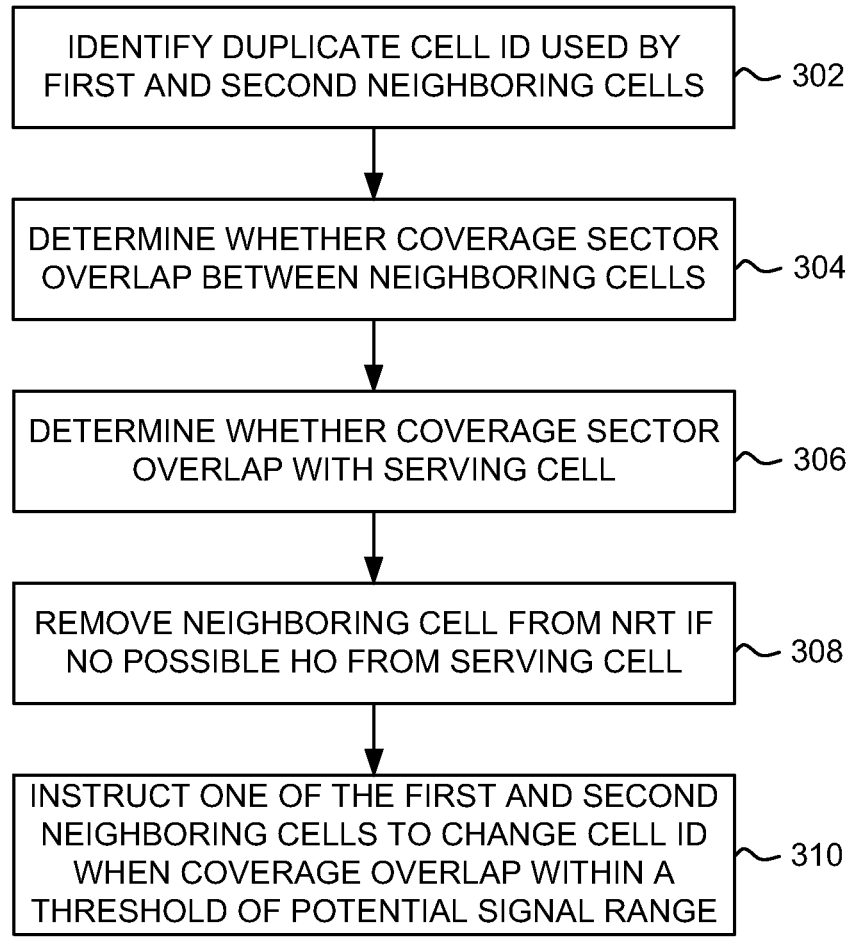
FIG. 3 illustrates an exemplary method of identifying and resolving cell ID confusion between neighboring cells in a wireless network.

FIG. 3 illustrates an exemplary method for identifying and resolving cell ID confusion between neighboring cells in a wireless network. The method will be discussed with reference to the exemplary communication system 200 illustrated in FIG. 2, however, the method can be implemented with any suitable communication system.

Referring to FIG. 3, at step 302, a serving access node may determine that first and second neighboring cells of first and second neighboring access nodes have a duplicate cell ID. The duplicate cell ID may be contained in a database on or otherwise accessible by the serving access node, such as an NRT.

Signal information for cells within one or more of the neighboring access nodes may be received by a serving cell within the serving node in response to a network reporting event triggered at one or more wireless devices. The reporting event may be based on a first signal level of the first access node and a second signal level of one of more of the second access nodes. However, the reporting event may also be based on scheduled access node maintenance or monitoring, or any other relevant network event. In one exemplary embodiment, wireless device 202 may receive a reference signal or pilot signal from access node 204 at a received signal level and a reference signal or pilot signal from access node 206 at a received signal level. In an embodiment, a reporting event may be triggered at the wireless device 202 based on at least the received first signal level and the received second signal level. In response to the reporting event, wireless device 202 may transmit signal information comprising a signal level for the reference signal or pilot signal received from access node 206 and an identifier for access node 206 (e.g., PCI, CGI, ECI, ECGI, eNB-ID, or the like).

In an embodiment, an access node or cell communication link (e.g., an X2 connection) may be established between access nodes 204, 206, and 286. In a further embodiment, a handover of wireless device 202 may be performed from access node 204 to a cell within access node 206 based on the established communication link.

At step 304, coverage sector overlap between neighboring is determined. The received signal information for neighboring access nodes 206 and 208 may be used to determine coverage sector overlap. If the signal information for each of the cells with the duplicate cell ID shows up in a single signal measurement report for a wireless device such as wireless device 202, this is an indication that there is coverage sector overlap between the neighboring cells. However, neighboring cells may not show up on a single report if they are neighbors of the serving cell, but not directly with one another, such as cells $\alpha_2$ and $\alpha_3$ of neighboring access nodes 206 and 208.

The previously established communication link may be used to transmit network characteristics from each of the cells within second access nodes to one or more cells within the first access node. In an embodiment, access node 204 may receive network characteristics from one or more cells within access nodes 206 and 208, and the network characteristics may be used to determine whether each of the cells within access nodes 206 and 208 would be capable of handover of a wireless devices such as wireless device 202. In another embodiment, one or more cells within access node 204 may receive the network characteristics from another network node, such as a controller node.

At step 306, network characteristics are received during the time period for one or more second neighboring cells. The network characteristics may be received by the serving cell within access node 204, or may be received by another network node. The network characteristics may be transmitted by yet another node, by wireless devices, or by the access nodes within which the cells are located. The one or more second neighboring cells are neighboring cells that are detected through an automatic neighbor relations protocol or another other suitable protocol and may be distinct from, may overlap with, or may be a subset of the one or more first neighboring cells. The network characteristics may comprise information that may demonstrate that an opportunity for handover does or does not exist. An exemplary embodiment of network characteristics for second neighboring cells is a number of successful handovers between each of the neighboring cells and the serving cell. If there is no coverage sector overlap, or minimal to the point that it inhibits the handover process, there will be a low number of successful handovers and this may indicate that no handover opportunity exists. The existence of a handover opportunity at other cells within the same access node may also be factored.

At step 308, cells for which there is no opportunity for handover to the serving cell may be removed from the serving cell database, which in an exemplary embodiment may be an NRT. Other network characteristics may also be factored into a reconfiguration of the NRT, such as relative signal levels, overall resource block usage, connectivity indicators, or other relevant information regarding capability to initiate and sustain wireless connection for a given purpose.

At step 310, one of the cells having the duplicate cell ID may be removed from the database of the serving cell. When network characteristics indicate that the cell is not a candidate for handover from the serving cell, the cell having the duplicate cell ID may be removed from the serving cell database rather than initiate a process to change cell ID, which may waste network resources and lead to congestion or latency of traffic.

Figure 4:
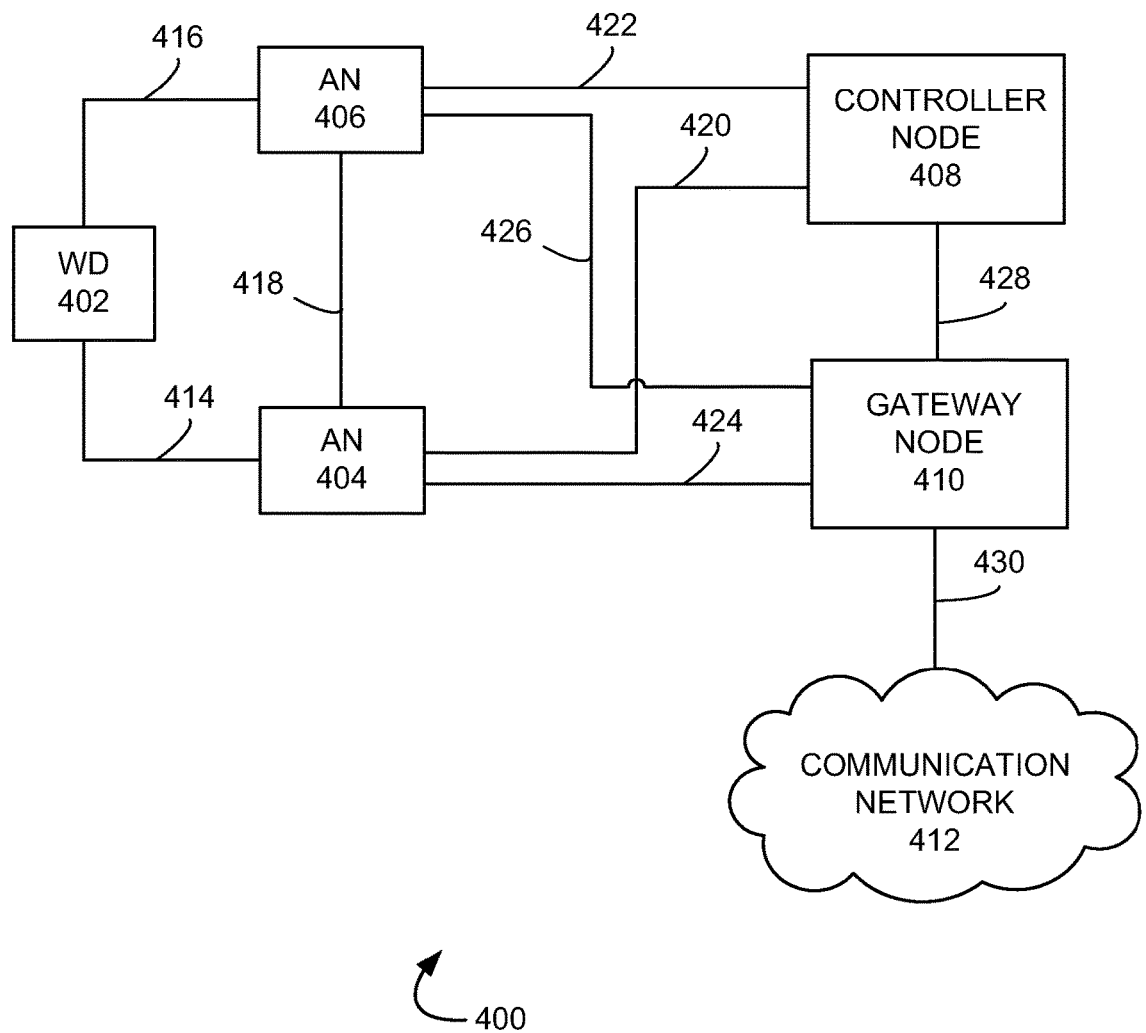
FIG. 4 illustrates another exemplary system to identify and resolve cell ID confusion between neighboring cells in a wireless network.

FIG. 4 illustrates another exemplary communication system 400 to determine a communication access node for a wireless device. Communication system 400 may comprise a wireless device 402, access nodes 404 and 406, controller node 408, gateway node 410, communication network 412, and communication links 414, 416, 418, 420, 422, 424, 426, 428, and 430.

Other network elements may be present in the communication system 400 to facilitate communication but are omitted for clarity, such as base stations, base station controllers, gateways, mobile switching centers, dispatch application processors, and location registers such as a home location register or visitor location register.

Wireless device 402 can be any device configured to communicate over communication system 400 using a wireless communication link. For example, wireless device 402 can include a cell phone, a smart phone, a computing platform such as a laptop, palmtop, or a tablet, a personal digital assistant, or an internet access device, and combinations thereof.

Access nodes 404 and 406 are network nodes capable of providing wireless communications to wireless device 402, and can be, for example, a base transceiver station, a radio base station, a NodeB device, or an enhanced NodeB (eNodeB) device. In an embodiment, access node 404 can comprise a serving access node for wireless device 402. Access nodes 404 and 406 may communicate with controller node 408 over communication links 420 and 422, and with gateway node 410 over communication links 424 and 426. Access nodes 404 and 406 may also communicate directly with each other over communication link 418.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), a mobile switching center (MSC), and combinations thereof. In an embodiment, access nodes 406 and 408 or controller node 408 may perform portions of the steps illustrated in the methods of FIGS. 3 and 5.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access nodes 404 and 406 related to channel selection in communications with wireless device 402. For example, gateway node 410 can comprise at least one of a serving gateway (SGW), a packet data network gateway (PDNGW), a cellular gateway (CGW), and combinations thereof.

Communication network 412 can be any communication network, and can comprise processing nodes, routers, gateways, and physical and/or wireless data links for carrying data among various network elements, including combinations thereof, and can include a local area network, a wide area network, and an internetwork (including the Internet). Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (Wi-MAX). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, 424, 426, 428, and 430 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may facilitate communication among access nodes 404 and 406, controller node 408, gateway node 410, and communication network 412 which are omitted for clarity, including additional processing nodes, routers, gateways, and physical and/or wireless data links for carrying data among the various network elements.

Figure 5:
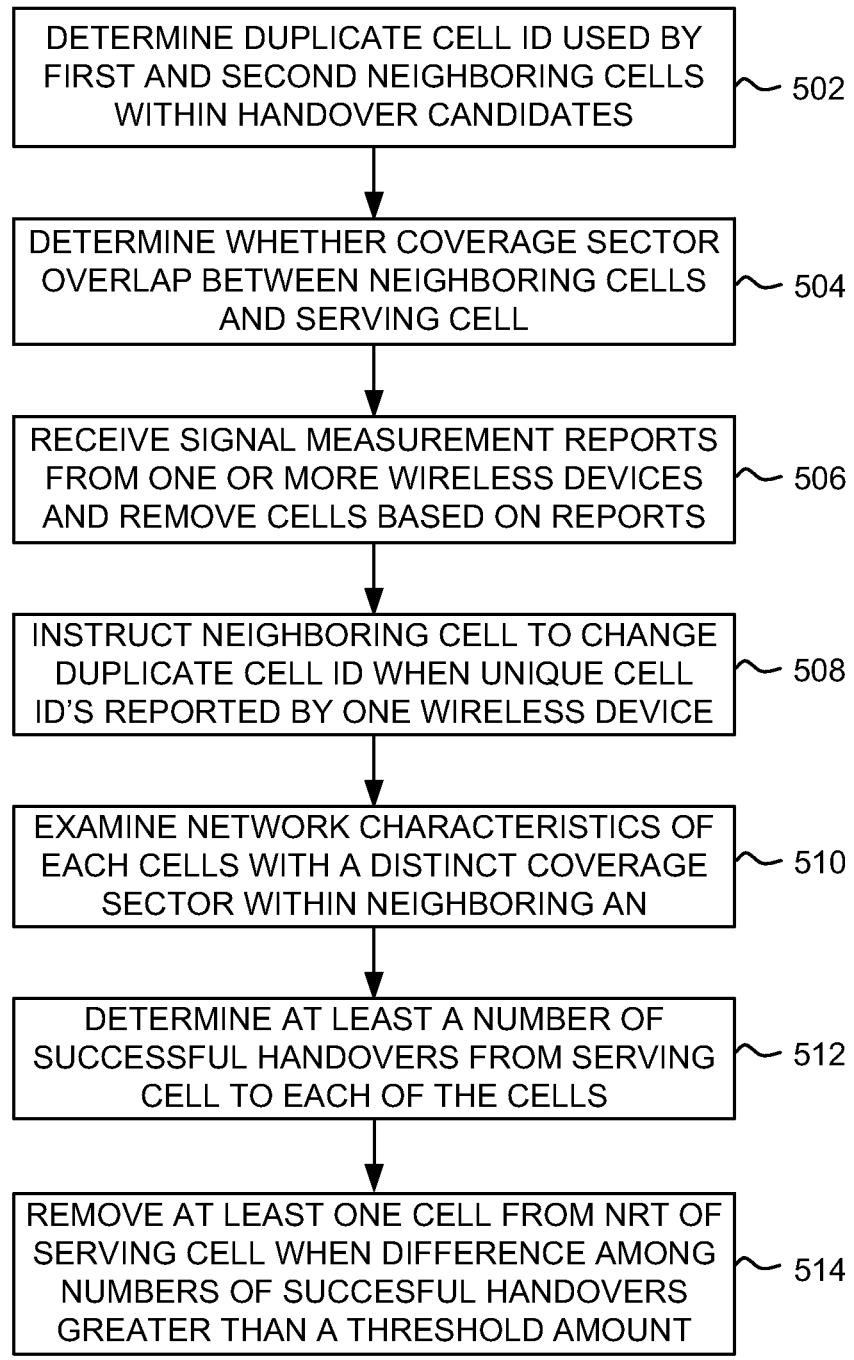
FIG. 5 illustrates another exemplary method of identifying and resolving cell ID confusion between neighboring cells in a wireless network.

FIG. 5 illustrates an exemplary method for identifying and resolving cell ID confusion between neighboring cells in a wireless network. The method will be discussed with reference to the exemplary communication system 400 illustrated in FIG. 4, however, the method can be implemented with any suitable communication system.

Referring to FIG. 5, at step 502, a serving access node may determine that first and second neighboring cells of first and second neighboring access nodes have a duplicate cell ID. The duplicate cell ID may be contained in a database on or otherwise accessible by the serving access node, such as an NRT.

Signal information for cells within one or more of the neighboring access nodes may be received by a serving cell within the serving node in response to a network reporting event triggered at one or more wireless devices. The reporting event may be based on a first signal level of the first access node and a second signal level of one of more of the second access nodes. However, the reporting event may also be based on scheduled access node maintenance or monitoring, or any other relevant network event. In one exemplary embodiment, wireless device 202 may receive a reference signal or pilot signal from access node 204 at a received signal level and a reference signal or pilot signal from access node 206 at a received signal level. In an embodiment, a reporting event may be triggered at the wireless device 202 based on at least the received first signal level and the received second signal level. In response to the reporting event, wireless device 202 may transmit signal information comprising a signal level for the reference signal or pilot signal received from access node 206 and an identifier for access node 206 (e.g., PCI, CGI, ECI, ECGI, eNB-ID, or the like).

In an embodiment, an access node or cell communication link (e.g., an X2 connection) may be established between access nodes 204, 206, and 286. In a further embodiment, a handover of wireless device 202 may be performed from access node 204 to a cell within access node 206 based on the established communication link.

At step 504, a serving access node may determine coverage sector overlap based on signal measurement reports and network characteristics for neighboring access nodes 404 and 406. If the signal information for each of the cells with the duplicate cell ID shows up in a single signal measurement report for a wireless device such as wireless device 402, this is an indication that there is coverage sector overlap between the neighboring cells. However, neighboring cells may not show up on a single report if they are neighbors of the serving cell, but not directly with one another, as seen with cells $\alpha_2$ and $\alpha_3$ of neighboring access nodes 206 and 208, which as noted above may be similar to access nodes 404 and 406.

At step 506, signal measurement reports are received by a serving cell from one or more wireless devices. The signal measurement reports may be signal levels for cells within access nodes such as access nodes 404 and 406. If multiple cells appear on a single signal measurement report from a single wireless device such as wireless device 402, this is an indication that there is coverage sector overlap between these cells.

At step 508, an access node may instruct a neighboring cell having a duplicate cell ID and overlapping coverage sectors with the other neighboring cell having the duplicate cell ID to change its cell ID. Once the access node or other network node determines that the coverage sectors of the cells having the duplicate cell ID overlap, then a handover opportunity exists and one of the cells may be instructed to change its cell ID.

At step 510, network characteristics are received during a time period for one or more neighboring cells within access nodes such as access nodes 404 and 406. The network characteristics may be received by serving cells as previously discussed. The network characteristics may be transmitted by yet another node, by wireless devices, or by the access nodes within which the cells are located. The one or more neighboring cells are neighboring cells that may be configured by a network operator or through an ANR protocol or another suitable protocol. The network characteristics may comprise information that may demonstrate the existence of a handover opportunity between the neighboring cells and the serving cell. In an embodiment, the network characteristics may be a number of successful handovers to each of the neighboring cells during the time period. The number of successful handover may be an indicator that an opportunity for handover exists or does not exist. As each cell within a particular neighboring access node has a distinct coverage sector within that access node, information for each of the cells may be compared to determine whether a number of successful handovers below a threshold is a sufficient to remove the cell from the serving cell database.

At step 512, the numbers of successful handovers between the neighboring cells and the serving cell are determined. A network operator may configured various thresholds such that when the numbers of successful handovers for the cells are above or below these limits, certain databased maintenance actions may be triggered. Database maintenance actions include removal of cells for which there is no opportunity for handover or reconfiguration of the database to change priority of cells or designate that a particular cell is not preferred or preferred by wireless devices having specific application requirements. There may be other network characteristics for reconfiguring the database, such as relative signal levels or interference within cells, overall data usage, or other relevant information regarding capability to initiate and sustain wireless connection for a given purpose, such as mobility or application requirements.

At step 514, a serving cell may remove a cell from the database, or NRT, when various conditions are met. In one example, if there are no successful handovers to a cell within a neighboring access node during the given period of time, this may be taken as an indication that there is no coverage sector overlap, and so this cell may be removed. However, it may be desirable to ensure that the period of time is sufficient to establish the opportunity for handovers to occur. In another example, there may be a very low number of successful handover to one cell (i.e. below a low threshold) and a requisite number of successful handovers to the other cells within the same neighboring access node as the one cell. (i.e. above a threshold higher than the low threshold). This may be yet another indication that there is not sufficient coverage sector overlap to perform handovers.

In an embodiment, application requirements of one or more wireless devices may comprise service conditions that a wireless device requests from an access node, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement. In an embodiment, the application requirements may be based on one or more applications running on one or more wireless devices such as wireless device 402 when these wireless devices attempt to wirelessly connect with a cell that within the cluster or within the consolidated list of neighboring cells for the cluster.

Although the methods described perform steps in a particular order for purposes of illustration, the methods discussed herein are not limited to any particular order or arrangement. Various method steps may be performed simultaneously in order to establish through parallel processes whether there is coverage sector overlap. One skilled in the art, using the disclosure provided herein, will appreciate that various steps of the methods can be omitted, rearranged, combined, and/or adapted in various ways.

Figure 6:
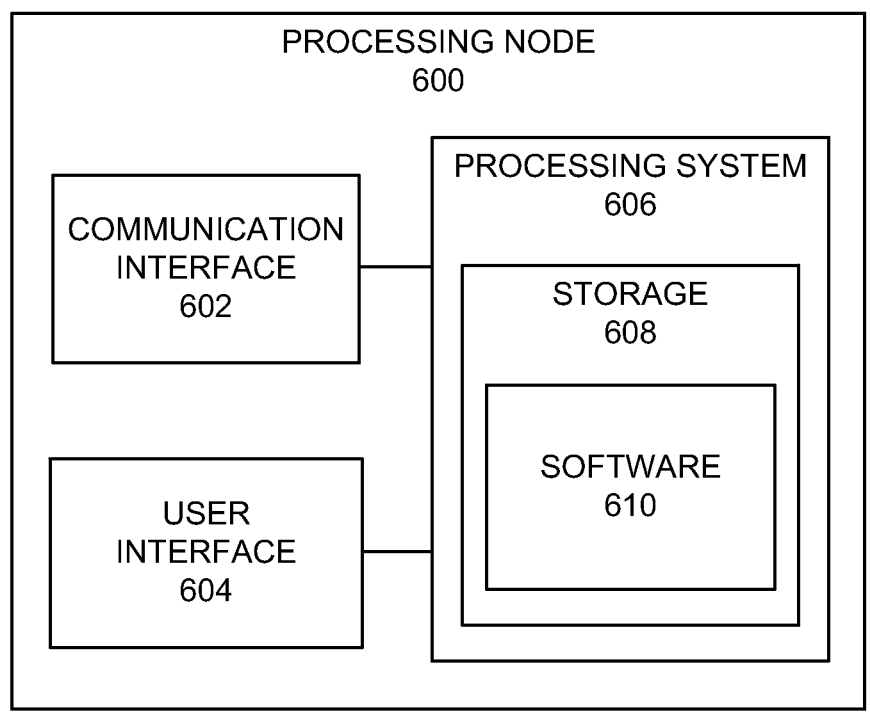
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include controller node 408 and gateway node 410. Processing node 600 can also be an adjunct or component of a network element, such as an element of access nodes 104, 106, 404, or 406. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices. Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for identifying and resolving cell identifier confusion between neighboring cells in a wireless network, the method comprising:
    determining, by a processor operatively coupled to a network node, that two or more neighboring cells from among a plurality of neighboring cells have a duplicate cell identifier;
    determining, by the processor, whether a coverage sector overlap occurs between the two or more neighboring cells themselves or between each of the two or more neighboring cells separately and a serving cell that provides wireless communication to at least one wireless device, wherein determining whether the coverage sector overlap occurs is based on signal measurement reports received from the at least one wireless device, wherein coverage sector overlap is determined to occur when two of the two or more neighboring cells having the duplicate cell identifier appear in a single signal measurement report for a single wireless device from among the at least one wireless device;
    determining a first number of successful handovers performed between the serving cell and at least one of the two or more neighboring cells and a second number of successful handovers performed between the two or more neighboring cells themselves; and
    removing, by the processor, at least one of the two or more neighboring cells from a database of the serving cell when the first number of successful handovers is below a first threshold and the second number of successful handovers is above a second threshold over a time period.

2. The method of claim 1,
    wherein the signal measurement reports include at least reports of one or more reference signal levels for each of the neighboring cells within one or more neighboring access nodes,
    wherein each of the one or more neighboring access nodes has a plurality of cells, and
    wherein each of the plurality of cells within each access node has a coverage sector that is distinct from coverage sectors of all other cells in the plurality of cells within that access node.

3. The method of claim 1, wherein coverage sector overlap is further determined by a unique cell identifier for each of the two or more neighboring cells having the duplicate cell identifier, and wherein the unique cell identifier is a global cell identifier (CGI) or E-UTRAN global cell identifier (eCGI).

4. The method of claim 2, wherein coverage sector overlap is determined by examining network characteristics of all cells within each of two or more neighboring access nodes having the neighboring cells determined to have the duplicate cell identifier.

5. The method of claim 4, wherein the network characteristics are included in a database accessible by the serving cell containing information about the one or more neighboring access nodes.

6. The method of claim 2, wherein each cell of the two or more neighboring cells within each of the two or more neighboring access nodes has a coverage sector that is distinct from coverage sectors of all other cells of the plurality of cells within that access node.

7. The method of claim 6, wherein each of the two or more neighboring access nodes has three or more distinct coverage sectors that correspond to three or more neighboring cells within each of the two or more neighboring access nodes, and wherein the method further comprises:
    removing at least one cell of the three or more neighboring cells from the database of the serving cell when the first number successful handovers between the serving cell and the at least one cell is below the first threshold and a third number of successful handovers between the serving cell and the remaining cells of the three or more neighboring cells aside from the at least one cell to be removed is above a third threshold, wherein the first threshold is less than or equal to the third threshold.

8. The method of claim 6, wherein each of the two or more neighboring access nodes has three neighboring cells, each neighboring cell having a distinct coverage sector from all other neighboring cells within the same neighboring access node,
    wherein the distinct coverage sectors are equally spaced around a circumference of an overall coverage area of each neighboring access node, and
    wherein the method further comprises:
    removing one of the neighboring cells from the database of the serving cell when both of the other neighboring cells within the same neighboring access node report successful handovers above a second threshold while the one neighboring cell reports to be removed reports a number of successful handovers below a third threshold, wherein the third threshold is less than the second threshold, and wherein the second and third thresholds are more than the first threshold.

9. A system for identifying and resolving cell identifier confusion between neighboring cells in a wireless network, the system comprising:
    a serving access node in wireless communication with at least one wireless device, wherein the serving access node has a database of all potential neighboring access nodes, the database including information regarding one or more neighboring cells located within each potential neighboring access node, and
    a processor coupled to the serving access node, wherein the processor enables the serving access node to:
    determine that two or more of the plurality of neighboring cells have a duplicate cell identifier based on information contained in the database;
    determine whether a coverage sector overlap occurs between the two or more neighboring cells themselves or between each of the two or more neighboring cells separately and a serving cell within the serving access node, wherein determining whether the coverage sector overlap occurs is based on signal measurement reports received from the at least one wireless device, wherein coverage sector overlap is determined to occur when two of the two or more neighboring cells having the duplicate cell identifier appear in a single signal measurement report for a single wireless device from among the at least one wireless device;

determining a first number of successful handovers performed between the serving cell and at least one of the two or more neighboring cells and a second number of successful handovers performed between the two or more neighboring cells themselves; and remove at least one of the two or more neighboring cells from the database when the first number of successful handovers is below a first threshold and the second number of successful handovers is above a second threshold over a time period.

10. The system of claim 9, wherein the signal measurement reports include reports of reference signal levels for each of the plurality of neighboring cells within the one or more neighboring access nodes in range of the one or more wireless devices,
wherein each of the one or more neighboring access nodes has a plurality of cells, and
wherein each of the plurality of cells within each access node has a coverage sector that is distinct from coverage sectors of all other cells in the plurality of cells within that access node.

11. The system of claim 9, wherein coverage sector overlap is further determined by a unique cell identifier for each of the two or more neighboring cells having the duplicate cell identifier, and
wherein the unique cell identifier is a global cell identifier (CGI) or E-UTRAN global cell identifier (eCGI).

12. The system of claim 10, wherein coverage sector overlap is determined by examining network characteristics of all cells within each of two or more neighboring access nodes having the neighboring cells determined to have the duplicate cell identifier.

13. The system of claim 12, wherein the network characteristics are included in the neighboring cell information of the serving cell database.

14. The system of claim 10, wherein each cell of the two or more neighboring cells within each of the two or more neighboring access nodes has a coverage sector distinct from coverage sectors of all other cells of the plurality of cells within that access node.

15. The system of claim 14, wherein each of the two or more neighboring access nodes has three or more distinct coverage sectors that correspond to three or more neighboring cells within each of the two or more neighboring access nodes, and wherein the method further comprises:
removing at least one cell of the three or more neighboring cells from the database of the serving cell when the number successful handovers between the serving cell and the at least one cell is below a second threshold amount and the number of successful handovers between the serving cell and the remaining cells of the three or more neighboring cells aside from the at least one cell to be removed is above a third threshold amount, wherein the second threshold amount is less than or equal to the third threshold amount.

16. A method for identifying and resolving cell identifier confusion between neighboring cells in a wireless network, the method comprising:
determining, by a processor operatively coupled to a network node, that two or more neighboring cells from among a plurality of neighboring cells have a duplicate cell identifier;
determining, by the processor, whether a coverage sector overlap exists between the two or more neighboring cells themselves or between each of the two or more neighboring cells separately and a serving cell that provides wireless communication to at least one wireless device,
wherein said coverage sector overlap is determined by simultaneously analyzing signal measurement reports received from one or more of the at least one wireless device and network characteristics of all cells within each of the neighboring access nodes having the neighboring cells determined to have the duplicate cell identifier, said network characteristics being a first number of successful handovers between at least one of the cells within each neighboring access node and the serving cell and a second number of successful handovers between each of the cells themselves, said network characteristics further being maintained on a serving cell database, wherein said coverage sector overlap is determined to occur when two of the two or more neighboring cells having the duplicate cell identifier appear in a single signal measurement report for a single wireless device from among the at least one wireless device; and
removing, by the processor, cell information for one of the two or more neighboring cells from the serving cell database when the first number of successful handovers is below a first threshold and the second number of successful handovers is above a second threshold over a time period.

* * * * *